United States Patent [19]
Debeneix

[11] Patent Number: 5,190,245
[45] Date of Patent: Mar. 2, 1993

[54] TURBOJET ENGINE EXHAUST CASING WITH INTEGRAL SUSPENSION LUGS

[75] Inventor: Pierre Debeneix, St Sauveur Sur Ecole, France

[73] Assignee: Societe Nationale D'Etude Et De Construction De Moteurs D'Aviation "S.N.E.C.M.A.", Paris, France

[21] Appl. No.: 899,913

[22] Filed: Jun. 17, 1992

[30] Foreign Application Priority Data

Jun. 19, 1991 [FR] France .................... 91 07515

[51] Int. Cl.[5] .............................. B64D 27/00
[52] U.S. Cl. ..................... 244/54; 60/39.31; 248/554
[58] Field of Search .......... 244/53 R, 54, 12.5, 244/53 B, 1 N, 55; 239/265.19, 265.28, 265.29, 265.35, 265.39, 265.41; 60/39.31

[56] References Cited

U.S. PATENT DOCUMENTS 3,848,832 11/1974 Stanley et al. .................. 244/54
4,742,975 5/1988 Pachomoff et al. ............. 244/54

FOREIGN PATENT DOCUMENTS 0431800 6/1991 European Pat. Off. .
1506952 4/1978 United Kingdom .
2129501 5/1984 United Kingdom .

OTHER PUBLICATIONS

Joubert, European Pub. App. 0028970, May 1981.

Primary Examiner—Galen Barefoot
Attorney, Agent, or Firm—Oblon, Spivak, McClelland, Maier & Neustadt

[57] ABSTRACT

The exhaust casing of a turbojet engine has a cross-sectional shape in the form of a regular polygon and carries at least three external hanging lugs provided with holes for receiving fixing axles of a rear suspension structure for the engine. The lugs are carried by non-consecutive sides of the casing in such a manner that the geometrical axis of the hole of each lug is situated at the intersection of the median planes of the two sides of the casing adjacent the side carrying the lug.

3 Claims, 2 Drawing Sheets

TURBOJET ENGINE EXHAUST CASING WITH INTEGRAL SUSPENSION LUGS

BACKGROUND OF THE INVENTION

1. Field of the Invention

The invention relates to the exhaust casing of a turbojet engine provided with hanging lugs for the attachment of the rear suspension structure by which the engine is suspended from a mast situated under the wing of an aircraft.

2. Summary of the Prior Art

The hanging of a turbojet engine under the wing of an aircraft is effected by means of a mast designed to ensure the mechanical transmission of the stresses between the engine and the aircraft structure. The turbojet engine is suspended from the mast at two points defining a front suspension and a rear suspension. The transmission of the thrust itself is effected by inclined thrust take-up bars situated on both sides of the engine.

The rear suspension structure normally comprises at least three outer hanging lugs or forks which are formed integrally with the upper part of the turbojet engine exhaust casing. These lugs permit the exhaust casing to be fixed to the lower ends of three suspension links which have their upper ends mounted on an arcuate hanging structure fixed directly under the mast serving to support the turbojet engine.

In the case where the exhaust casing has a cross-section in the form of a regular polygon the sides of which are defined by flat plates of the casing, the geometrical axes of the hanging lugs are normally situated at vertices of the polygon. This characteristic permits only tensile or compressive suspension stresses to be generated in the structure of the flat plates adjacent the hanging lugs. This enables the thickness of these plates to be given a minimum value which would be inadequate if the method of suspension were to bring about bending stresses.

The hanging lugs are attached to the lower ends of the suspension links by fixing axles oriented parallel to the geometrical axis of the turbojet engine. This leads to the formation of a scallop shaped indented part in the outer surface of the turbojet engine exhaust casing in line with each of the hanging lugs. The depth of this indented part is all the greater as the loads to be transmitted are the more substantial, because the diameter of the securing axles must be increased.

The exhaust casing supports a central casing or hub by means of arms which are inclined relative to a radial direction and are connected to the exhaust casing at the vertices of the polygonal cross-section thereof. These arms define between them sectors in which the gases issuing from the turbojet combustion chamber are channelled. The indented parts formed in line with the hanging lugs thus have the effect of reducing the cross-sectional area of flow of the exhaust gases in the corresponding sectors. The disturbance thus generated relative to the theoretical flow stream of the gases in each sector results in a lowering of the turbojet output and an increase in fuel consumption. These effects are all the more marked as the load transmitted through each of the hanging lugs is increased.

Furthermore, the inclined arms supporting the central hub are of unequal lengths, depending on whether or not they are connected to the exhaust casing at the location of a hanging lug. This introduces an imbalance when thermal expansions occur at the various speeds of the turbojet engine.

To overcome these drawbacks the hanging lugs may be moved outwards relative to the vertices of the polygonal cross-section of the exhaust casing, as illustrated in particular in document GB-A-1 506 952. However, the stresses created by the suspension of the turbojet then introduce localised bendings in the flat plates forming the exhaust casing, which requires the thickness of the plates to be increased and, consequently, increases the mass of the turbojet. Thus, a result is obtained which is the reverse of that being sought.

SUMMARY OF THE INVENTION

It is an object of the invention, therefore, to provide a turbojet engine exhaust casing of the type having hanging lugs forming part of the rear suspension structure of the engine, the design of which permits the continuity of the theoretical flow path of the exhaust gases to be preserved and the mechanical behaviour of the assembly under thermal expansion to be improved, without causing any local bending in the plates forming the sides of the exhaust casing and, consequently, without causing any increase in the mass of the turbojet engine.

To this end, according to the invention there is provided an exhaust casing for a turbojet engine, said casing having a cross-sectional shape in the form of a regular polygon providing said casing with a plurality of sides, and at least three hanging lugs carried externally by said casing to form part of a rear suspension structure for said engine, wherein each of said hanging lugs is carried by one of said sides of said casing and is situated in the extension of the two sides of said casing adjacent said one side.

In such a construction the stresses borne by the plates forming the sides of the polygonally shaped exhaust casing remain limited strictly to tensile and compression stresses. Also, the positioning of the hanging lugs facing certain sides of the casing, and no longer at the vertices of the polygonal cross-section, enables the formation of scallop-shaped indented parts in the outer surface of the casing in line with the lugs to be avoided. Consequently, all the sectors defined inside the casing by the inclined arms have exactly the same cross-section, such that the continuity of the theoretical flow path of the exhaust gases is preserved over the entire circumference of the casing. Moreover, the position occupied by the hanging lugs in accordance with the invention permits all the arms connecting the exhaust casing to the central hub to be of equal length, which ensures a better mechanical behaviour of the assembly when thermal expansion occurs.

Preferably, each of the hanging lugs has a through hole with a given geometrical axis which is situated at the intersection of the planes containing the two sides of the casing adjacent the one side on which the lug is carried.

Preferably, the sides of the casing which carry consecutive hanging lugs are separated by only a single side of the casing.

A preferred embodiment of the invention will now be described, by way of example, with reference to the attached drawings.

DESCRIPTION OF THE PREFERRED EMBODIMENT

Figure 1:
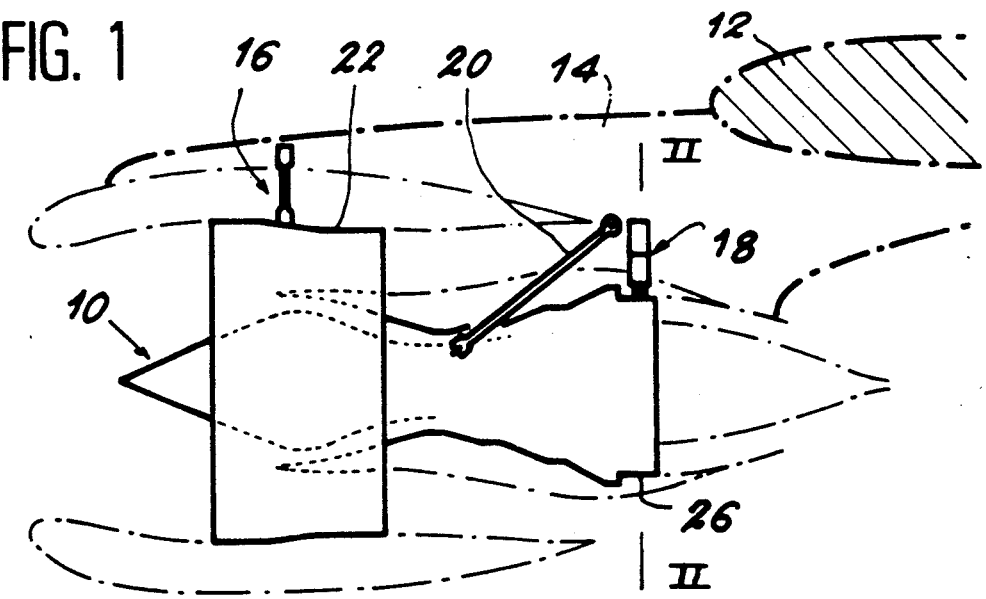
FIG. 1 is a side view, partly in section, illustrating in a very diagrammatic manner the suspension of a turbojet engine under the wing of an aircraft.

In FIG. 1 a representation is given of the suspension of a turbojet engine 10 under the wing of an aircraft 12 of which only the front part of the wing is visible, this suspension being achieved by means of a mast 14 which projects forward below the leading edge of the wing 12.

The turbojet engine 10 is suspended from the mast 14 by a front suspension structure 16 and a rear suspension structure 18 permitting demounting of the turbojet engine whenever necessary. The connection between the turbojet engine 10 and the mast 14 is completed by thrust take-up bars 20 situated on both sides of the engine and through which the thrust exerted by the turbojet engine is transmitted by the mast 14 to the wing 12 of the aircraft.

The front suspension structure 16 of the turbojet engine 10 normally includes suspension links (not shown) fastened at their upper ends to the front part of the mast 14, and at their lower ends to the fan casing 22.

The rear suspension structure 18 comprises, in a known manner, an arc-shaped hanging structure (not shown) secured on the mast 14, and suspension links (not shown), of which there are generally three in number, attached at their upper ends by means of axles to the arc-shaped hanging structure, and at their bottom ends by means of axles to hanging lugs or bosses 24 formed integrally with the exhaust casing 26 of the turbojet engine 10.

Figure 2:
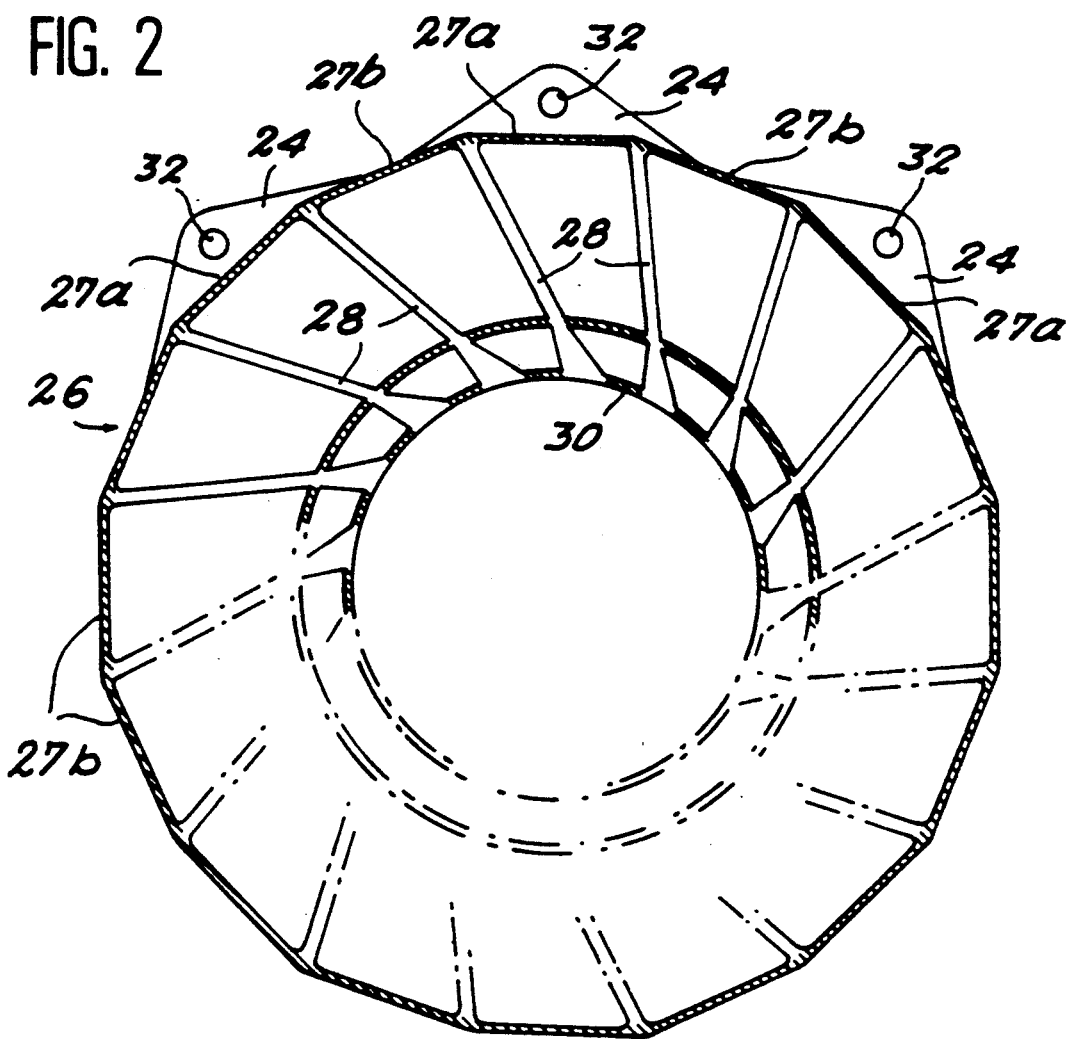
FIG. 2 is a cross-section taken along the line II—II in FIG. 1, illustrating on a larger scale the exhaust casing of the engine constructed in accordance with a preferred embodiment of the invention.

As shown in FIG. 2, the exhaust casing 26 of the turobjet engine is a unitary casing which has a cross-sectional shape in the form of a regular polygon, the polygon having sixteen vertices and sides in the example shown. The sides of the polygon are defined by successive flat plates 27a,27b of the exhaust casing 26. The casing 26 is connected by rectilinear arms 28 to a central hub 30, the arms 28 being evenly distributed around the periphery of the hub and being connected at their outer ends one to each of the vertices of the polygonal cross-section of the casing 26. There are therefore sixteen arms 28 in the embodiment shown in FIG. 2.

In a known manner, the arms 28 are all inclined in the same direction and at the same angle, for example 15°, relative to a radial direction. This characteristic permits differential expansion between the exhaust casing 26 and the hub 30, without involving the danger of buckling in the arms 28.

Each of the three hanging lugs 24 with which the exhaust casing 26 is externally equipped has a through hole 32, of circular cross-section, for receiving an axle (not shown) to connect the hanging lug to the lower end of a suspension link (not shown). The three hanging lugs 24 are located on the upper part of the casing 26 and, in accordance with the invention, are mounted on three of the flat plates defining the sides of the polygonally shaped casing 26. The three flat plates carrying the lugs 24 are denoted by the references 27a in FIGS. 2 and 3, to distinguish them from the remaining plates 27b of the casing which do not carry any lugs.

Figure 3:
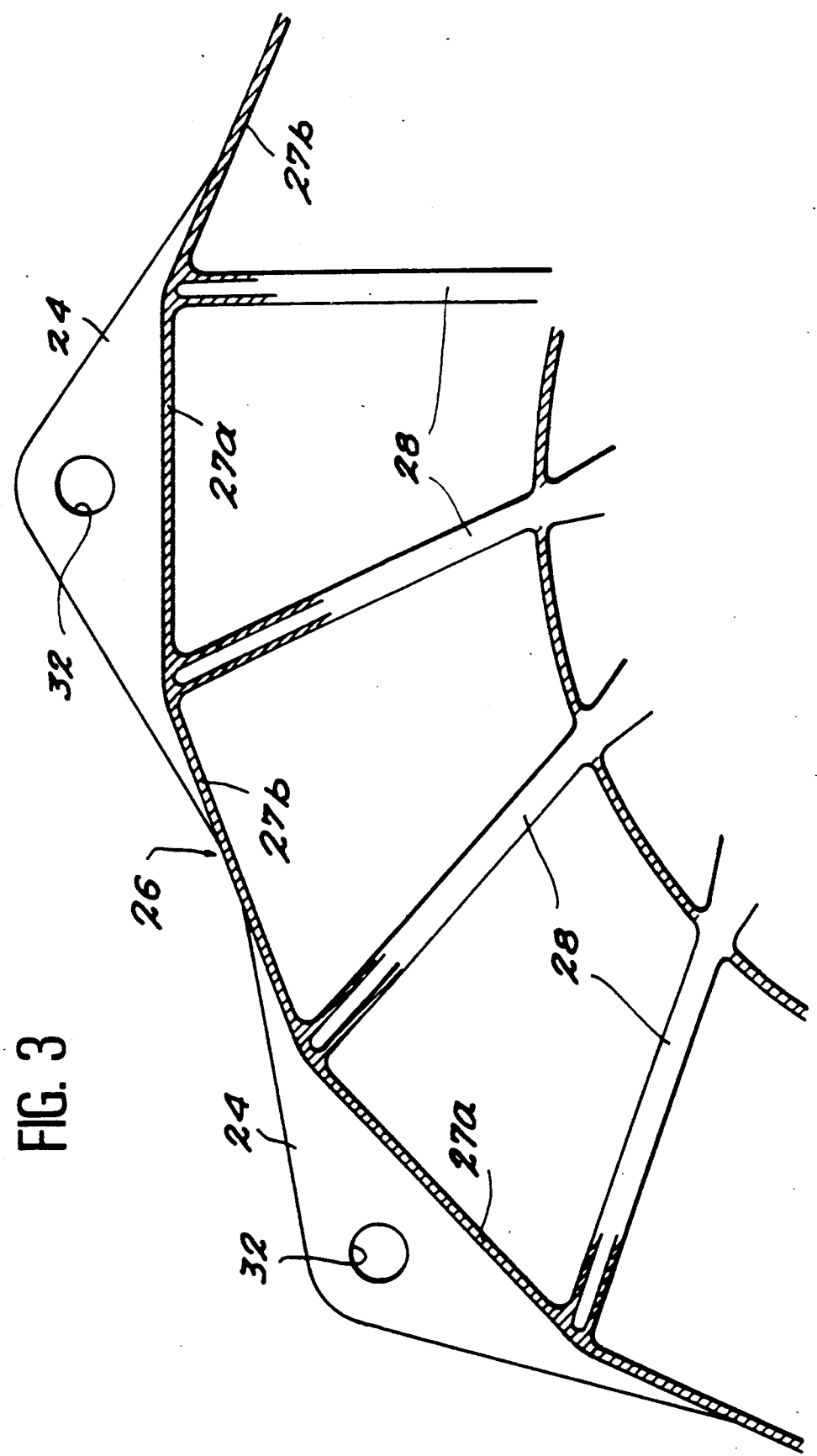
FIG. 3 is a view of part of FIG. 2 on an even greater scale showing the structure of the exhaust casing in the vicinity of the hanging lugs which are carried by the casing.

In the embodiment shown in FIGS. 2 and 3, the lugs 24 are mounted on three alternate plates 27a of the casing, so that each pair of consecutive plates 27a carrying hanging lugs 24 are separated by a single plate 27b without a lug.

The hole 32 which is formed in each lug is arranged in such a manner that its geometrical axis is situated at the intersection of the median planes of the two sides 27b of the casing 26 adjacent the side 27a carrying the lug 24.

In addition, one of the lugs 24 is arranged in such a manner that the geometrical axis of its through hole 32 is situated in the central vertical plane of the casing 26, while the other two lugs 24 are disposed symmetrically on opposite sides of this central vertical plane. The geometical axes of the holes 32 through these other two lugs 24 are therefore situated at 45° on each side of the central vertical plane when the regular polygonal section of the casing has sixteen sides.

The mounting of the lugs 24 on the sides of the polygonal exhaust casing 26, as well as the arrangement of the geometrical axes of the holes 32 formed in these lugs at the intersection of the median planes of the sides 27b adjacent the sides 27a carrying the lugs, ensure that only tensile and compression stresses can be generated in the plates 27b of the casing 26 adjacent the plates 27a carrying the lugs 24, not bending stresses. Consequently, the thickness of the plates 27a and 27b of the casing 26 can be minimized, so that the mass of the turbojet engine is not penalized by the suspension structure.

In addition, the arrangement of the lugs 24 in accordance with the invention enables deformation of the exhaust casing 26 in the vicinity of the holes 32 through the lugs 24 to be avoided. Consequently, all the sectors of the casing 26 defined between consecutive arms 28 have the same cross-sectional area as each other, including those sectors which are adjacent a hanging lug 24. As a result of this particular arrangement, the continuity of the theoretical flow path of the turbojet exhaust gases is not disturbed by the presence of the lugs 24.

Also, the arrangement of the lugs 24 in accordance with the invention enables all of the arms 28 to have exactly the same length, thus improving the mechanical behaviour of the assembly when undergoing thermal expansion as compared with known arrangements.

It will of course be understood that the invention is not limited to the particular embodiment which has been described above by way of example, and a variety of alternatives may be envisaged. For example, it will be appreciated that the number of hanging lugs provided on the exhaust casing may be greater than three if it is desired to provide one or more additional hanging points in order to increase safety.

I claim:

1. An exhaust casing for a turbojet engine, said casing having a cross-sectional shape in the form of a regular polygon providing said casing with a plurality of sides, and at least three hanging lugs carried externally by said casing to form part of a rear suspension structure for said engine, wherein each of said hanging lugs is carried by one of said sides of said casing and is situated in the extension of the two sides of said casing adjacent said one side.

2. An exhaust casing according to claim 1, wherein each of said hanging lugs has a through hole with a given geometrical axis, said axis being situated at the intersection of the planes containing said two sides of said casing adjacent said one side carrying said hanging lug.

3. An exhaust casing according to claim 1, wherein said one sides of said casing carrying consecutive hanging lugs are separated by a single side of said casing.

* * * * *